United States Patent
Shinomoto et al.

(10) Patent No.: US 9,322,587 B2
(45) Date of Patent: Apr. 26, 2016

(54) HEAT PUMP DEVICE, AIR CONDITIONER, AND REFRIGERATING MACHINE

(75) Inventors: Yosuke Shinomoto, Tokyo (JP); Kazunori Hatakeyama, Tokyo (JP); Shinsaku Kusube, Tokyo (JP); Shinya Matsushita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 300 days.

(21) Appl. No.: 14/126,867

(22) PCT Filed: Jun. 17, 2011

(86) PCT No.: PCT/JP2011/063933
§ 371 (c)(1),
(2), (4) Date: Dec. 17, 2013

(87) PCT Pub. No.: WO2012/172684
PCT Pub. Date: Dec. 20, 2012

(65) Prior Publication Data
US 2014/0174118 A1   Jun. 26, 2014

(51) Int. Cl.
*F25B 13/00* (2006.01)
*F25B 49/02* (2006.01)
(Continued)

(52) U.S. Cl.
CPC ............. *F25B 49/025* (2013.01); *F04B 49/06* (2013.01); *F04C 28/06* (2013.01); *F25B 30/02* (2013.01); *H02M 1/44* (2013.01); *H02M 7/53871* (2013.01); *F04C 2240/403* (2013.01);
(Continued)

(58) Field of Classification Search
CPC .. F25B 49/025; F25B 30/02; F25B 2600/021; F04B 49/06; F04C 28/06; F04C 2240/403; F04C 2270/701; H02M 1/44; H02M 7/53871; H02M 2007/53876; H02P 23/0036
See application file for complete search history.

(56) References Cited

U.S. PATENT DOCUMENTS 9,077,274 B2 * 7/2015 Shinomoto ........... F25B 49/025
2012/0111043 A1   5/2012 Hatakeyama et al.

FOREIGN PATENT DOCUMENTS

JP        60-68341 U    5/1985
JP        61-091445 A   5/1986
(Continued)

OTHER PUBLICATIONS

Extended European Search Report dated Mar. 20, 2015 issued in corresponding EP patent application No. 11867777.2.
(Continued)

*Primary Examiner* — Emmanuel Duke
(74) *Attorney, Agent, or Firm* — Posz Law Group, PLC

(57) ABSTRACT

A heat pump device that can efficiently feed a high-frequency current to an electric motor and effectively heat a compressor includes a compressor including a compression mechanism configured to compress a refrigerant and a motor configured to drive the compression mechanism, heat exchangers, an inverter configured to apply a voltage to the motor, and an inverter control unit configured to drive the inverter. The inverter control unit includes a stagnation detecting unit configured to determine whether heating of the compressor is necessary and notify the determination result and a high-frequency-alternating-current-voltage generating unit and a PWM-signal generating unit configured to shift to a heating operation mode when the heating is necessary and, in the heating operation mode, generate PWM signals to provide, based on a heating time carrier signal having two or more frequencies, a period in which a reflux current flows.

18 Claims, 8 Drawing Sheets

(51) Int. Cl.
*H02M 7/5387* (2007.01)
*F25B 30/02* (2006.01)
*H02M 1/44* (2007.01)
*F04C 28/06* (2006.01)
*F04B 49/06* (2006.01)

(52) U.S. Cl.
CPC ..... *F04C2270/701* (2013.01); *F25B 2600/021* (2013.01); *H02M 2007/53876* (2013.01)

(56) References Cited

FOREIGN PATENT DOCUMENTS

| | | |
|---|---|---|
| JP | 08-226714 A | 9/1996 |
| JP | 11-159467 A | 6/1999 |
| JP | 2010-004725 A | 1/2010 |
| JP | 2011-015452 A | 1/2011 |
| JP | 2011-024377 A | 2/2011 |
| JP | 2011-038689 A | 2/2011 |
| JP | 2011038689 A * | 2/2011 |
| JP | 2011-078296 A | 4/2011 |

OTHER PUBLICATIONS

Habetler et al. "Acoustic Noise Reduction in Sinusoidal PWM Drives Using a Randomly Modulated Carrier" IEEE Transactions on Power Electronics, Institute of Electrical and Electronics Engineers. vol. 6, No. 3, Jul. 1, 1991, pp. 356-363, USA.
Office Action mailed Mar. 30, 2015 in the corresponding CN application No. 201180071678.3 (and English translation).
Office Action mailed Sep. 16, 2014 issued in corresponding JP patent application No. 2013-520388 (and partial English translation).
International Search Report of the International Searching Authority mailed Sep. 20, 2011 for the corresponding international application No. PCT/JP2011/063933 (with English translation).

* cited by examiner

US 9,322,587 B2

HEAT PUMP DEVICE, AIR CONDITIONER, AND REFRIGERATING MACHINE

CROSS REFERENCE TO RELATED APPLICATION

This application is a U.S. national stage application of International Patent Application No. PCT/JP2011/063933 filed on Jun. 17, 2011, the disclosure of which is incorporated herein by reference.

TECHNICAL FIELD

The present invention relates to a heat pump device including a compressor and a refrigerating machine and an air conditioner including the heat pump device.

BACKGROUND

In an air conditioner and the like, various methods have been examined as a method of supplying a voltage to a compressor that smoothes lubricating action of the inside of the compressor. For example, there is a method of supplying a high-frequency low voltage to a compressor while operation is stopped during heating (see, for example, Patent Literature 1).

There is also a method of supplying a single-phase alternating current voltage having a frequency higher than a frequency during normal operation to a compressor when it is detected that an ambient temperature of an air conditioner is in a low-temperature state (see, for example Patent Literature 2).

PATENT LITERATURE

Patent Literature 1: Japanese Utility Model Publication No. S60-68341

Patent Literature 2: Japanese Patent Application Laid-Open No. S61-91445

In the technologies described in Patent Literatures 1 and 2, lubricating action in the inside of the compressor is smoothed by applying a high-frequency alternating-current voltage to the compressor according to a fall of an outdoor air temperature to heat or warm the compressor.

However, Patent Literature 1 has a problem in that there is no detailed description concerning a high-frequency low voltage and realizability of an object of smoothing the lubricating action in the inside of the compressor is not indicated.

Patent Literature 2 describes that a voltage is applied by a single-phase alternating-current power supply having a high frequency such as 25 kilohertz. Such effects are attained by the increase in the frequency of the single-phase alternating-current power supply that noise is suppressed because the frequency deviates from an audible range, vibration is suppressed because the frequency deviates from a resonant frequency, an input is reduced and a temperature rise is prevented through a reduction in a current by an amount of the inductance of a winding wire, and rotation of a rotating unit of the compressor is suppressed.

However, in the technology described in Patent Literature 2, because of the high-frequency single-phase alternating-current power supply, a relatively long all-OFF section where all switching elements are turned off is generated as shown in FIG. 3 of the cited literature 2. At this point, there is a problem in that a high-frequency current is regenerated to a direct-current power supply without refluxing through an electric motor via a reflux diode, an electric current in an OFF section is attenuated earlier, and the high-frequency current does not efficiently flow to the electric motor and heating efficiency of the compressor is deteriorated.

SUMMARY

The present invention has been devised in view of the above and it is an object of the present invention to obtain a heat pump device, an air conditioner, and a refrigerating machine that can efficiently feed a high-frequency current to an electric motor and effectively heat a compressor.

In order to solve the aforementioned problems, a heat pump device according to one aspect of the present invention is configured to includes: a compressor including a compression mechanism configured to compress a refrigerant and a motor configured to drive the compression mechanism; heat exchangers; an inverter configured to apply a desired voltage to the motor; and an inverter control unit configured to generate PWM signals for driving the inverter, wherein the inverter control unit includes: a heating determining unit configured to determine whether heating of the compressor is necessary and notify a determination result; and a PWM-signal generating unit configured to shift to, upon receiving the notification indicating that the heating is necessary, a heating operation mode for heating the compressor and, in the heating operation mode, generate the PWM signals to provide, based on a heating time carrier signal having two or more predetermined frequencies, a period in which a reflux current flows.

The heat pump device according to the present invention attains an effect that it is possible to efficiently feed a high-frequency current to an electric motor and effectively heat the compressor.

DETAILED DESCRIPTION

Embodiments of a heat pump device, an air conditioner, and a refrigerating machine according to the present invention are explained in detail based on the drawings.

First Embodiment

Figure 1:
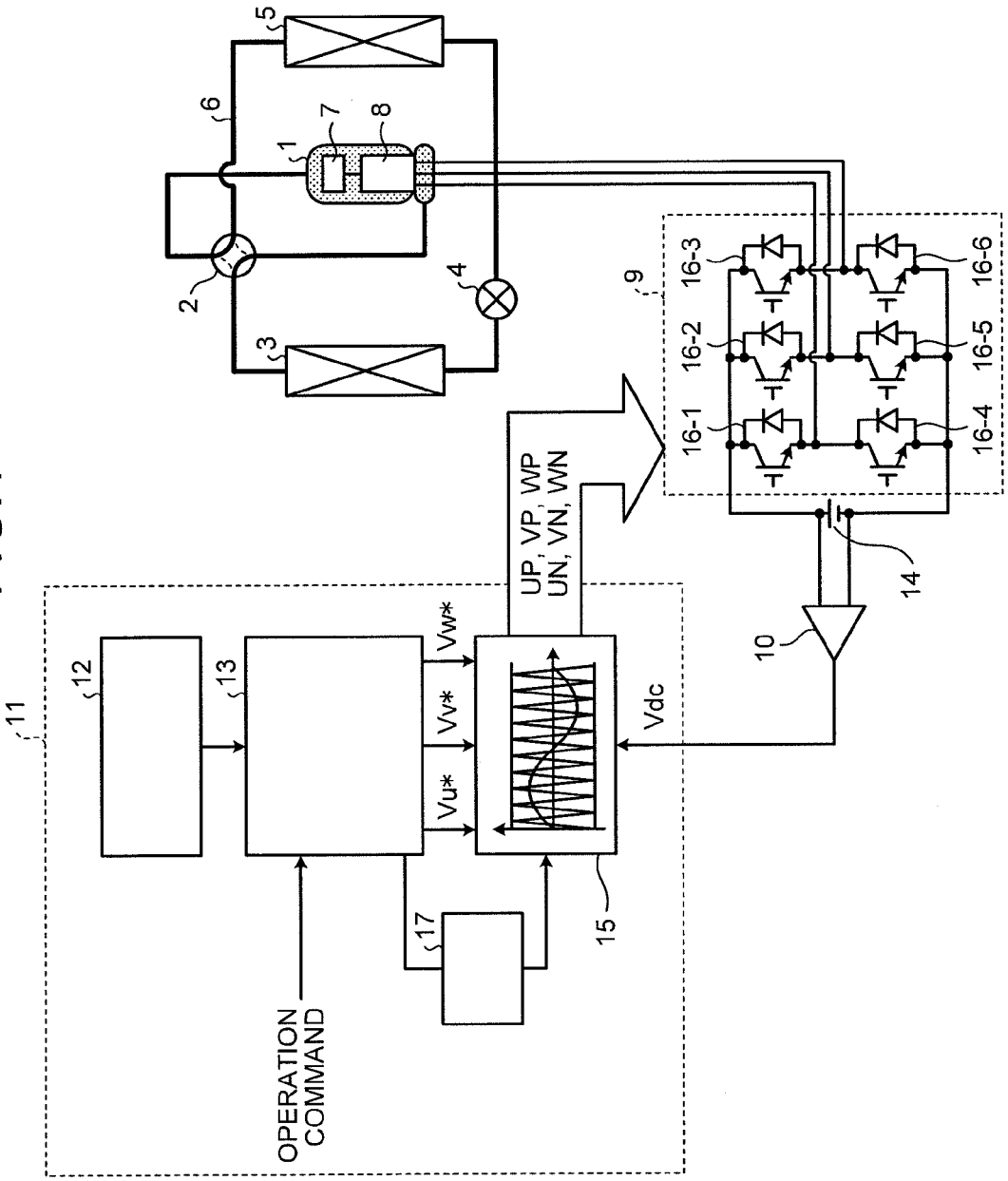
FIG. 1 is a diagram of a configuration example of an air conditioner in a first embodiment.

FIG. 1 is a diagram of a configuration example of the first embodiment of an air conditioner according to the present invention. The air conditioner in this embodiment is a separate type air conditioner and has a refrigerating cycle in which a compressor 1, a four-way valve 2, an outdoor heat exchanger 3, an expansion valve 4, and an indoor heat exchanger 5 are connected via a refrigerant pipe 6. A compression mechanism 7 configured to compress a refrigerant and a motor 8 configured to actuate the compression mechanism 7 are provided inside the compressor 1. An inverter 9 configured to apply a voltage to the motor 8 and drive the motor 8 is electrically connected to the motor 8. The air conditioner in this embodiment includes a direct-current power supply 14 to which the inverter 9 is connected and a bus-voltage detecting unit 10 configured to detect a bus voltage, which is a power supply voltage of the inverter 9. The compressor 1, the four-way valve 2, the outdoor heat exchanger 3, the expansion valve 4, the indoor heat exchanger 5, the inverter 9, the bus-voltage detector 10, and an inverter control unit 11 configure a heat pump device in the air conditioner.

A control input end of the inverter 9 is connected to the inverter control unit 11. A stagnation detecting unit 12, a high-frequency-alternating-current-voltage generating unit 13, a PWM (Pulse Width Modulation)-signal generating unit 15, and a carrier-frequency switching unit 17 are provided in the inverter control unit 11.

The inverter 9 includes bridge-wire bound switching elements 16-1 to 16-6. The inverter 9 drives, with PWM signals (UP, VP, WP, UN, VN, and WN) sent by the inverter control unit 11, the switching elements respectively corresponding to the PWM signals (UP corresponds to the switching element 16-1, VP corresponds to the switching element 16-2, WP corresponds to the switching element 16-3, UN corresponds to the switching element 16-4, VN corresponds to the switching element 16-5, and WN corresponds to the switching element 16-6).

In the inverter control unit 11, the stagnation detecting unit (a heating determining unit) 12 detects, based on the temperature of the refrigerating cycle, an elapsed time of the temperature, and the like, whether the refrigerant is in a stagnation state (a state in which a liquid refrigerant is stored in a closed case of the compressor 1), determines, based on whether the refrigerant is in the stagnation state (heating of the compressor 1 is necessary), whether the heating of the compressor is necessary, and notifies the high-frequency-alternating-current-voltage generating unit 13 of the determination result. When the notification is a notification indicating that the heating is necessary (the refrigerant is in the stagnation state), the high-frequency-alternating-current-voltage generating unit 13 shifts to a heating operation mode, calculates voltage commands Vu*, Vv*, and Vw* based on a command value of a voltage applied to the motor 8 in the compressor 1 as a voltage for heating, and outputs the calculated voltage commands to the PWM-signal generating unit 15. The PWM-signal generating unit 15 generates, based on the voltage commands, PWM signals at a carrier frequency designated from the carrier-frequency switching unit 17.

An operation is explained. In the inverter control unit 11 configured in this way, as explained above, while an operation command for the compressor 1 is stopped, when the stagnation detecting unit 12 detects that the refrigerant is in the stagnation state, the inverter control unit 11 changes to the heating operation mode and the inverter control unit 11 generates PWM signals for heating.

Figure 2:
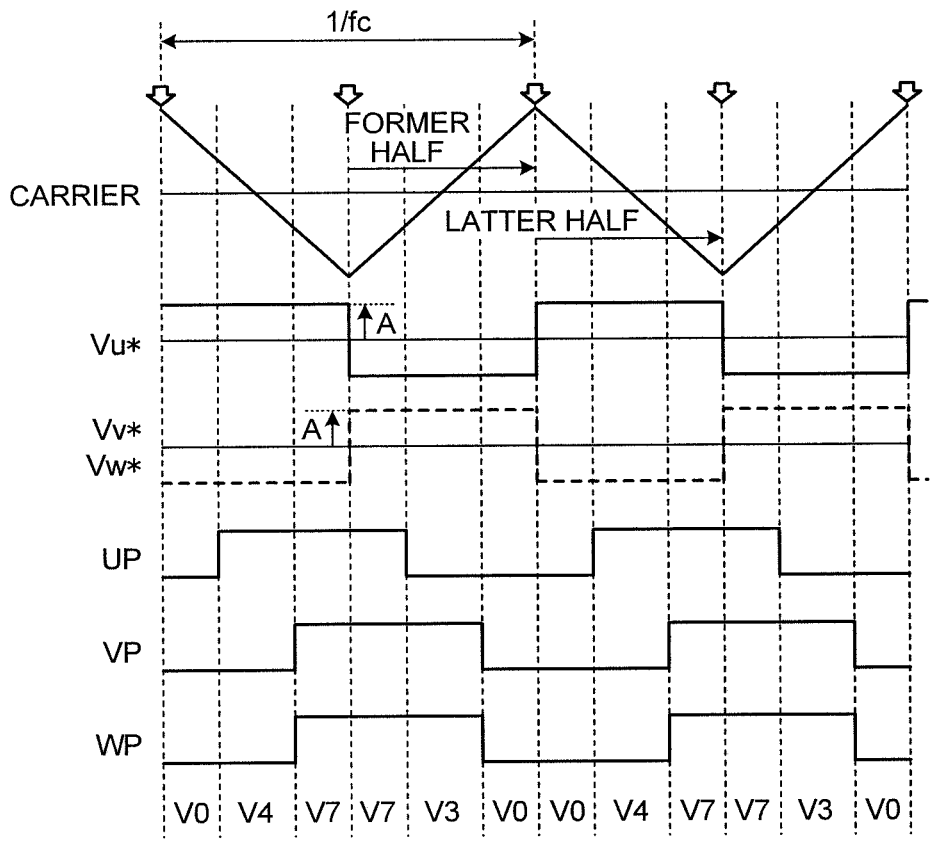
FIG. 2 is a diagram of an example of voltage commands and PWM signals generated as voltage commands and PWM signals for heating.

FIG. 2 is a diagram of an example of the voltage commands (Vu*, Vv*, and Vw*) and the PWM signals generated as voltage commands for heating. Based on the voltage commands Vu*, Vv*, and Vw* generated by the high-frequency-alternating-current-voltage generating unit 13, the PWM-signal generating unit 15 compares each of the voltage commands Vu*, Vv*, and Vw* with a carrier, generates PWM signals, and drives the switching elements 16-1 to 16-6 of the inverter 9 with the PWM signals to apply a voltage to the motor 8.

When the operation command is "operating", the inverter control unit 11 changes to the normal operation mode, generates PWM signals in the PWM-signal generating unit 15 such that the motor 8 rotates, and actuates the switching elements 16-1 to 16-6 of the inverter 9. The operation of the PWM-signal generating unit 15 in this case compares a carrier and voltage commands, which are modulated waves, and generates the PWM signals. However, as the generation, there is no problem even if the voltage commands are generated by two-phase modulation, third harmonic wave superimposition modulation, space vector modulation, or the like. Because the generation is a generally publicly-known technology, detailed description of the generation is omitted. Note that the operation command is input via, for example, a remote controller (not shown in the figures) of the air conditioner or an input unit (not shown in the figures) of an indoor machine and transmitted to the inverter control unit 11.

In the normal operation mode, when a general PWM signal is generated to rotate the motor 8, the carrier frequency is a frequency ten times or more as high as a modulated wave to be a source of an output frequency. This is because the resolution of a modulated wave signal is determined by the carrier frequency. Output accuracy of an output voltage is secured by setting the carrier frequency high. On the other hand, in the case of high-frequency voltage application for heating, as described in Patent Literature 2, because high-frequency sound is a problem, it is necessary to apply the high-frequency voltage at a frequency equal to or higher than 14 to 16 kilohertz to be an inaudible range. Therefore, in this embodiment, the heating operation mode for performing heating, the normal operation mode, and the carrier frequency are changed. Specifically, the carrier-frequency switching unit 17 notifies the PWM-signal generating unit 15 to switch the carrier frequency based on operation mode information acquired from the high-frequency-alternating-current-voltage generating unit 13.

An example of a method of generating PWM signals for high-frequency voltage application for heating is explained with reference to FIG. 2. First, the high-frequency-alternating-current-voltage generating unit 13 generates the voltage commands Vu*, Vv*, and Vw* that change in synchronization with timings of peaks and troughs (arrows in the figure) of a carrier (a frequency is fc) shown in FIG. 2. Consequently, opposite positive and negative voltage commands can be generated in the former half and the latter half of the carrier. Note that A in the figure indicates voltage values obtained when the voltage commands are Hi. When the voltage commands are Low, the voltage values are −A. In this way, the switching of the voltage commands is performed at the timings of the peaks and the troughs. The PWM-signal generating unit 15 compares the carrier and the voltage commands to generate PWM signals. Consequently, it is possible to output the PWM signals synchronized with the carrier.

As illustrated in FIG. 2, by comparing the voltage commands Vu*, Vv*, and Vw* with the carrier, PWM signals (UP, VP, and WP) for driving the switching elements 16-1 to 16-6 are generated. At this point, voltage vectors change in the order of V0 (UP=VP=WP=0)→V4 (UP=1, VP=WP=0)→V7 (UP=VP=WP=1)→V3 (UP=0, VP=WP=1)→V0 (UP=VP=WP=0) . . . , 0 is defined as OFF and 1 is defined as ON. The voltage vector described as V0 or V7 is referred to as zero vector. The other vectors are referred to actual vectors. Note that, although UN, VN, and WN are not shown in the figure, regarding the relation of UN and UP, VP and VN, and WP and WN, when one is ON, the other is OFF and, when one is OFF, the other is ON.

Figure 3:
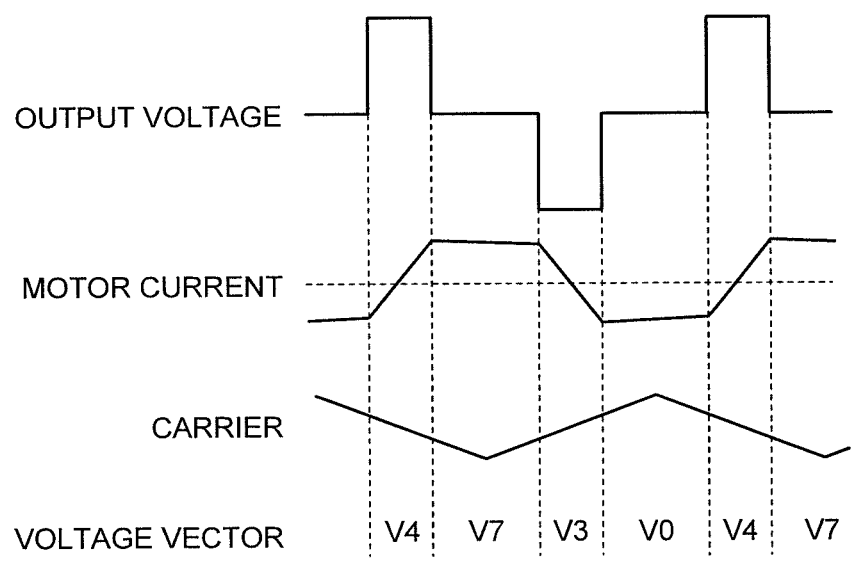
FIG. 3 is a diagram of an example of a motor current that flows when an inverter is actuated by the PWM signals shown in FIG. 2.

FIG. 3 is a diagram of an example of a motor current flowing to the motor 8 when the inverter 9 is actuated by the PWM signals shown in FIG. 2. As shown in FIG. 3, when the voltage vector is the actual vector V4, an output voltage changes to a positive value and the motor current increases. When the voltage vector is the actual vector V3, the output voltage changes to a negative value and the motor current decreases. When the voltage vector is the zero vectors V0 and V7, a reflux current circulating through the motor 8 and the inverter 9 is fed by diodes connected in inverse parallel of the switching elements 16-1 to 16-6 of the inverter 9.

In the method described in Patent Literature 2, when all the switching elements are turned off, the reflux current cannot flow, an electric current flows to only the diodes connected in inverse parallel, and the operation mode changes to a regeneration mode in which the electric current flows into the direct-current power supply. In general, the direct-current power supply is configured by a capacitor that accumulates electric charges. Therefore, in the regeneration mode, the electric current flowing to the motor 8 is steeply attenuated. Therefore, it is necessary to extend time during which the switching elements are turned on. When IGBTs (Insulated Gate Bipolar Transistors) or the like having an ON voltage higher than the ON voltage of the diodes are used as the switching elements, a conduction loss or the like caused by the flow of the electric current increases. In contrast, On the other hand, in this embodiment, not all the switching elements are turned off and a route for the reflux current is provided. Therefore, such a problem does not occur.

Figure 4:
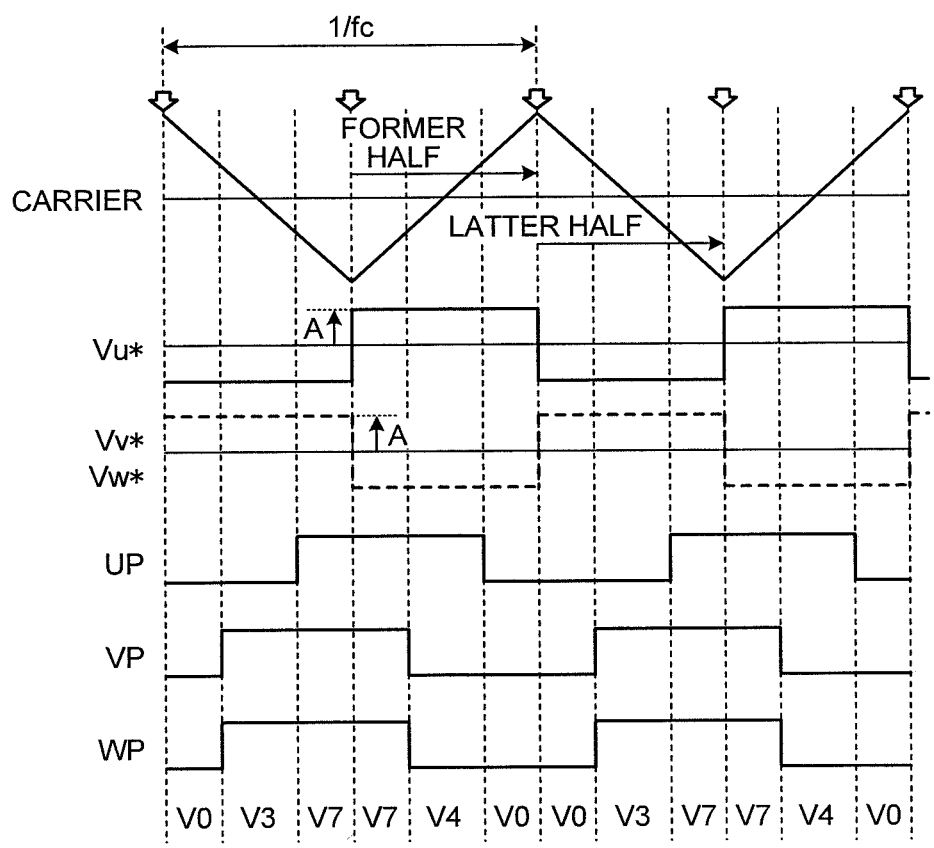
FIG. 4 is a diagram of a generation example of PWM signals different from the PWM signals shown in FIG. 2.

FIG. 4 is a diagram of a generation example of PWM signals different from the PWM signals shown in FIG. 2. A difference between the example shown in FIG. 2 and the example shown in FIG. 4 is that a phase relation of the voltage commands (Vu*, Vv*, and Vw*) with respect to the phase of the carrier frequency is inverted. Specifically, in a period of the former half (the valley to the peak) of the carrier, in the example shown in FIG. 2, the voltage command Vu* is −A(Lo). In contrast to this, in the example shown in FIG. 4, the voltage command Vu* is +A(Hi). Each of Vv* and Vw* is also inverted.

When the voltage commands shown in FIG. 4 are used, the voltage vectors change in the order of V7 (UP=VP=WP=1) →V4 (UP=1, VP=WP=0)→V0 (UP=VP=WP=0)→V3 (UP=0, VP=WP=1)→V7 (UP=VP=WP=1), . . . In the example shown in FIG. 2, the next vector of the voltage vector V7 is V3. In the example shown in FIG. 4, the next vector of the voltage vector V7 is V4.

Figure 5:
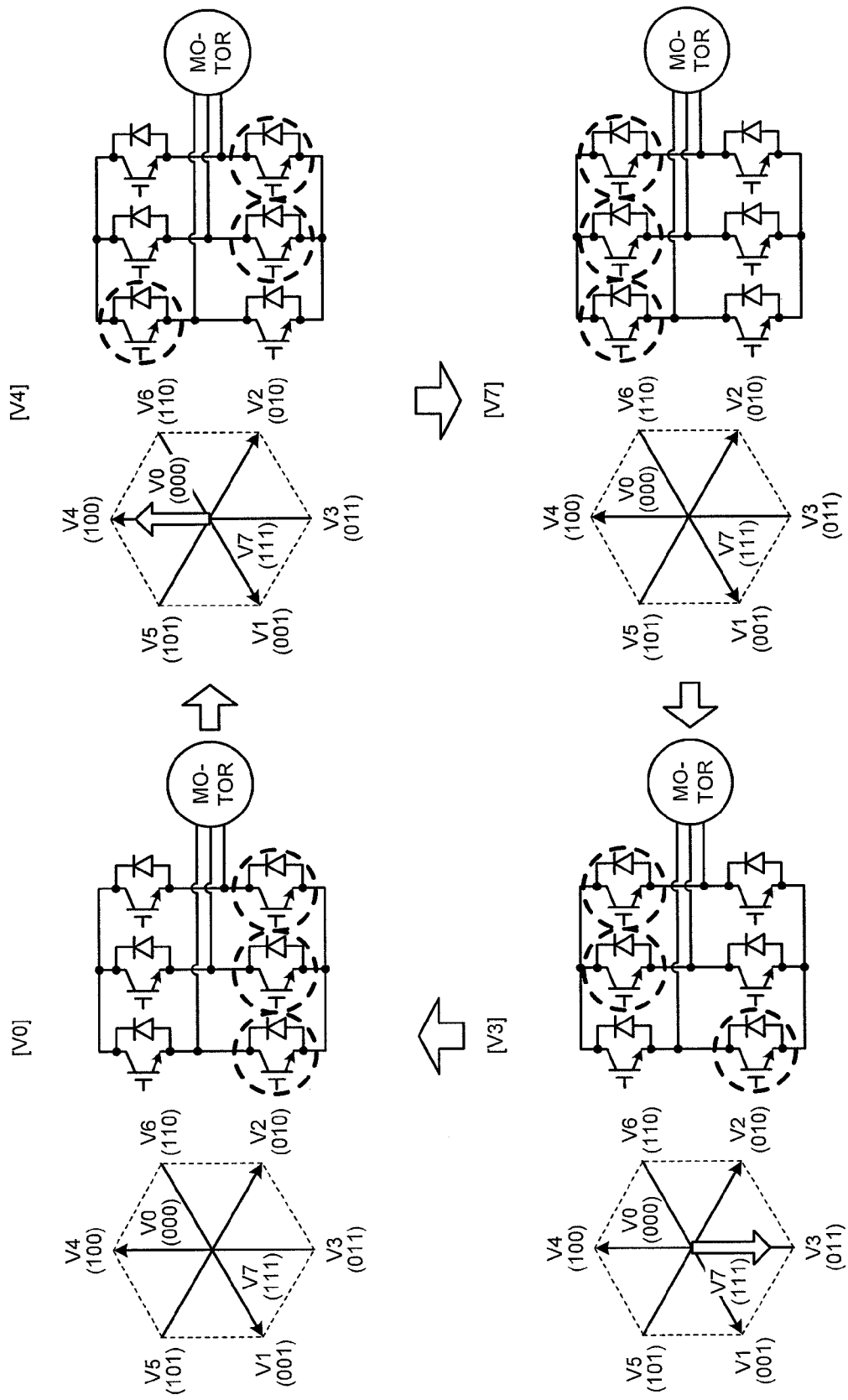
FIG. 5 is a diagram of ON/OFF states of switching elements 16-1 to 16-6 in the inverter corresponding to respective voltage vectors.

FIG. 5 is a diagram of ON/OFF states of the switching elements 16-1 to 16-6 in the inverter 9 corresponding to the respective voltage vectors. Respective circuit diagrams shown in FIG. 5 indicate that the switching elements surrounded by broken lines are ON and the other switching elements are OFF. A rotating direction of thick arrows indicating changing order of the voltage vectors (a rotating direction of the voltage vectors V0→V4→V7→V3→V0 . . . ) corresponds to the example shown in FIG. 2. In the case of the example shown in FIG. 4, a rotating direction is opposite to the rotating direction shown in FIG. 5 (counter clockwise).

In this example, the PWM signals generated for heating rotate through the four circuit states shown in FIG. 5 once at one carrier cycle. Consequently, it is configured in such a manner that a motor current having the one carrier period as one cycle is flown to the motor 8, and the waveform of the motor current shown in FIG. 3 is obtained. Note that, as explained above, in the heating operation mode, taking into account the problem of occurrence of high-frequency electromagnetic sound, a high-frequency current having an inaudible frequency, i.e., a high-frequency current having a frequency equal to or higher than 14 to 16 kilohertz is applied.

In the heating operation mode, as explained above, when an output frequency output from the inverter 9 is set to a high frequency equal to or higher than 14 to 16 kilohertz, an electric current is in the inaudible frequency range. Therefore the problem of electromagnetic sound is eliminated. In the normal operation mode, the output frequency output from the inverter 9 is a frequency lower than the output frequency in the heating operation mode, for example, a frequency equal to or lower than 1 kilohertz. For assurance, the carrier frequency in the normal operation mode is a frequency ten times or more as high as the output frequency output from the inverter 9.

On the other hand, the high-frequency electromagnetic sound is a problem in the heating operation mode because the frequency of the electric current flowing to the motor 8 and the carrier frequency for switching coincide with each other. Even in the normal operation mode, electromagnetic sound due to two frequencies of a carrier frequency and a motor current frequency occurs. However, in the heating operation mode, because the two frequencies coincide with each other, a situation is more serious concerning the electromagnetic sound.

When the switching is performed at a carrier frequency that becomes an inaudible frequency, the problem concerning electromagnetic sound is solved. However, naturally, a switching loss of the switching elements 16-1 to 16-6 configuring the inverter 9 increases. If the carrier frequency is high, a slight error in the switching elements and the PWM signal generation greatly affects an electric current flowing to the motor 8.

Therefore, in the following explanation, the heating operation mode in which electromagnetic sound is not a problem even at a carrier frequency with a relatively small switching loss, for example, a frequency equal to or lower than 10 kilohertz is explained. To reduce the influence of electromagnetic sound while performing switching at a carrier frequency that becomes an audible frequency, the switching elements are configured such that a carrier has two or more different cycles in the generation of PWM signals during the heating operation mode explained below in this embodiment.

Figure 6:
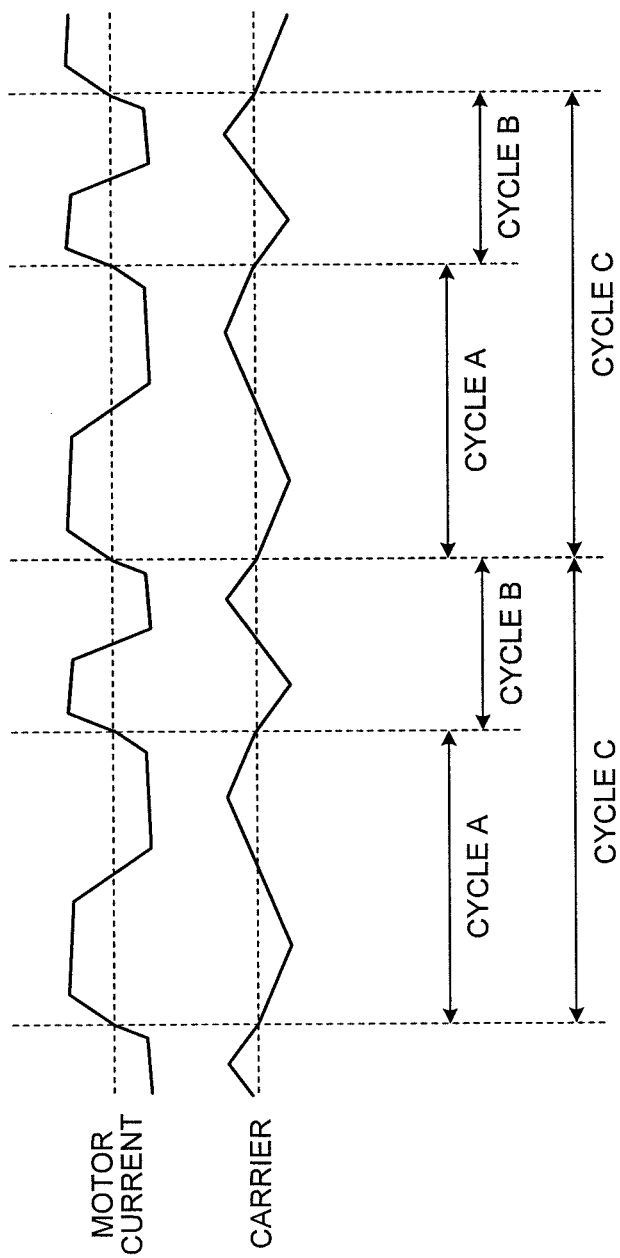
FIG. 6 is a diagram of an example of an operation waveform obtained when a carrier having two cycles of a cycle A and a cycle B is used.

FIG. 6 is a diagram of an example of an operation waveform obtained when a carrier having two cycles of a cycle A and a cycle B is used. As shown in FIG. 6, when the carrier is generated to alternately generate the different two cycles A and B, electromagnetic sound having, as a fundamental frequency, a cycle C to be a combined cycle of the cycle A and the cycle B occurs. Electromagnetic sound at respective frequencies (fundamental frequencies of the carrier) corresponding to the cycle A and the cycle B does not occur.

That is, electromagnetic sound having a frequency (a frequency corresponding to the cycle C) lower than a fundamental frequency of a carrier of PWM (a frequency corresponding to the cycles A and B) as a fundamental wave occurs. For example, when respective cycles are alternately arranged for each cycle as shown in FIG. 6 using two frequencies of 16 kilohertz and 20 kilohertz as the fundamental frequency of the carrier, electromagnetic sound having 8.89 kilohertz as a fundamental frequency occurs and electromagnetic sound having frequencies of 16 kilohertz and 20 kilohertz does not occur.

When a carrier is generated using three or more frequencies rather than two frequencies as fundamental frequencies of the carrier such that the frequencies alternately appear at each one cycle in a set order (i.e., a carrier having a different carrier frequency is generated at each one cycle in a predetermined order), electromagnetic sound having, as a fundamental wave, a frequency extremely lower than a cycle at which the switching elements 16-1 to 16-6 operate occurs. For example, when respective cycles corresponding to five different fundamental frequencies ($f_1, f_2, f_3, f_4,$ and $f_5$) are represented as ($T_1, T_2, T_3, T_4,$ and $T_5$) and a carrier is generated in a set order such as $T_1, T_2, T_3, T_4, T_5, T_1, T_2, \ldots$ for each one cycle, a fundamental wave component $f_{base}$ of generated electromagnetic sound is represented by the following Formula (1). Note that the order of the cycles is not limited to $T_1, T_2, T_3, T_4, T_5, T_1, \ldots$ and can be any order such as $T_5, T_4, T_3, T_2, T_1, T_5, \ldots$.

[Math. 1]

$$f_{base} = \frac{f_1 \cdot f_2 \cdot f_3 \cdot f_4 \cdot f_5}{f_1 \cdot f_2 \cdot f_3 \cdot f_4 + f_2 \cdot f_3 \cdot f_4 \cdot f_5 + f_1 \cdot f_3 \cdot f_4 \cdot f_5 + f_1 \cdot f_2 \cdot f_4 \cdot f_5 + f_1 \cdot f_2 \cdot f_3 \cdot f_5} \quad (1)$$

When the number of fundamental frequencies of a carrier is considered to be generalized to n (n is an integer equal to or larger than 2), if it is assumed that all the n fundamental frequencies have values close to f enough for approximating the fundamental frequencies as $f_1 \equiv f_2 \equiv f_3 \equiv \ldots f_n \equiv f$ to simplify the numerical formula, $f_{base}$ obtained when the number of fundamental frequencies of the carrier is n can be approximated by the following Formula (2):

$$f_{base} = f^n/(n \times f^{n-1}) = f/n \quad (2)$$

Therefore, $f_{base}$ is generally asymptotic to a frequency of 1/n. Therefore, when an average frequency of the n fundamental frequencies of the carrier is represented as f, electromagnetic sound having a fundamental wave of about 1/n of f occurs.

As explained above, a large cycle (corresponding to the cycle C shown in FIG. 6) configured by five cycles different from one another such as $T_1, T_2, T_3, T_4,$ and $T_5$ or $T_5, T_4, T_3, T_2,$ and $T_1$ is referred to as combined cycle and $f_{base}$ is referred to as combined frequency.

The heating operation mode is a mode for heating the motor 8 making use of an iron loss of the motor 8. Heating energy due to the iron loss depends on a fundamental frequency of a carrier (a frequency of switching). However, the heating is efficient, for example, if the switching frequency is set to about several kilohertz. If a carrier is generated such that cycles of a plurality of different fundamental frequencies appear in predetermined order as explained above, electromagnetic sound having a frequency that is same as electromagnetic sound that occurs when a carrier frequency is equivalently low. Therefore, by increasing the number of fundamental frequencies of the carrier while maintaining the switching frequency at a frequency efficient for heating, it is possible to reduce electromagnetic sound to an inaudible frequency on a low frequency side inaudible to the human ears, in general, for example, a frequency equal to or lower than about 20 hertz. For example, if the respective fundamental frequencies of the carrier are several kilohertz, electromagnetic sound caused by setting the number of fundamental frequencies of the carrier to several hundred can be reduced to the inaudible frequency.

Therefore, it is possible to realize improvement of energy saving through a reduction in a switching loss in the inverter and a reduction in an environmental load through a reduction in size of a radiation fin due to a heat generation reduction. At the same time, an output of an electric current having a frequency necessary for heating the motor 8 from the inverter 9 is also realized.

To realize the operation explained above, in this embodiment, when a command for a shift to the heating operation mode is received from the high-frequency-alternating-current-voltage generating unit 13, the carrier-frequency switching unit 17 instructs the PWM-signal generating unit 15 to cyclically change the carrier frequency to different values in the predetermined order as explained above. Specifically, because the carrier frequency is changed at each one cycle, the carrier-frequency switching unit 17 instructs timing of a change of the carrier frequency and the next frequency. Note that the high-frequency-alternating-current-voltage generating unit 13 also uses a carrier in generating a voltage command. However, the high-frequency-alternating-current-voltage generating unit 13 can use, for example, a carrier generated by the PWM-signal generating unit 15.

Note that, in this embodiment, in the heating operation mode, the high-frequency-alternating-current-voltage generating unit 13 generates voltage commands based on the carrier and the PWM-signal generating unit 15 generates PWM signals based on the voltage commands and the carrier. That is, in the heating operation mode, the high-frequency-alternating-current-voltage generating unit 13 and the PWM-signal generating unit 15 have a function of a PWM-signal generating unit in a broad sense that generates PWM signals for heating based on the carrier.

In the example explained above, the fundamental frequency of the electromagnetic sound caused by changing the carrier frequency to different carrier frequencies in order is reduced to a low frequency. However, the carrier frequency can be changed to be different in a random number manner. In this case, the electromagnetic sound is not reduced in a frequency. However, because a plurality of fundamental wave components to be a plurality of peak frequencies are generated, peaks of the electromagnetic sound are dispersed. Therefore, although an overall value, i.e., a so-called overall total value does not change, the peaks are distributed, whereby the electromagnetic sound is not monotonously heard, is not harsh noise, and is heard as dispersed sound as a whole. Therefore, harshness can be improved.

When the plurality of carrier frequencies are changed in good order within the combined cycle, the order of the carrier frequencies is arranged such that a difference among frequencies that change at a time does not become excessively large. This is for the purpose of preventing a change in a current change ratio di/dt of an electric current flowing to the motor 8 from increasing because of a large change of a frequency, and causing unnecessary electromagnetic sound. Therefore, a change amount of the frequencies changing at a time is desirably about several kilohertz at most.

Further, the carrier frequency is changed such that a cycle (a combined frequency) for changing a plurality of different carrier frequencies in good order becomes a cycle smaller than 20 hertz, which is in an inaudible frequency band on a low frequency side. Consequently it is possible to manage peak frequencies at more accurate frequencies than frequencies obtained when a pattern for artificially changing a frequency is fixedly set.

It is also possible to generate beat sound of the electromagnetic sound by grouping a plurality of different fundamental frequencies into two or more groups and changing the carrier frequency to arrange the groups in predetermined order in the combined cycle. When the beat sound is simply generated, harsh sound only increases. However, by setting phases of the electromagnetic sound to be opposite among the groups, the electromagnetic sounds in the respective phases cancel each other, so that the electromagnetic sound caused as noise is reduced. Consequently, it is possible to reduce the frequencies of the peaks of the electromagnetic sound and disperse the peak frequencies.

According to the heating operation mode explained above, the liquid refrigerant held up in the compressor 1 is heated and vaporized by the motor heating and leaks to the outside of the compressor 1. The stagnation detecting unit 12 determines, according to the temperature of the refrigerating cycle and the duration of the temperature, whether the refrigerant leak occurs and the refrigerant returns from the stagnation state to the normal state. When determining that the refrigerant returns from the stagnation state to the normal state, the stagnation detecting unit 12 notifies the high-frequency-alternating-current-voltage generating unit 13 to that effect and ends the heating operation mode.

As explained above, in this embodiment, when the stagnation detecting unit 12 detects that the refrigerant is in the stagnation state, the high-frequency-alternating-current-voltage generating unit 13 shifts to the heating operation mode and generates a voltage command synchronized with the carrier. The PWM-signal generating unit 15 generates, based on the voltage commands and the carrier, PWM signals for controlling the switching elements 16-1 to 16-6 of the inverter 9 to prevent all of the switching elements 16-1 to 16-6 from being turned off. Therefore, it is possible to form a route for refluxing through the electric motor, efficiently feed a high-frequency current to the electric motor, and efficiently heat the compressor.

Note that the heat pump device in this embodiment is not limited to the air conditioner and can be applied to various apparatuses including refrigerating cycles such as a refrigerating machine, a heat pump water heater, and a refrigerator.

In this embodiment, in the heating operation mode, the carrier-frequency switching unit 17 instructs the PWM-signal generating unit 15 to switch the carrier frequency among the two or more different carrier frequencies. The high-frequency-alternating-current-voltage generating unit 13 and the PWM-signal generating unit 15 use a carrier generated based on this instruction. Therefore, it is possible to reduce the influence of electromagnetic sound while using the carrier frequency that enables efficient heating.

Second Embodiment

Figure 7:
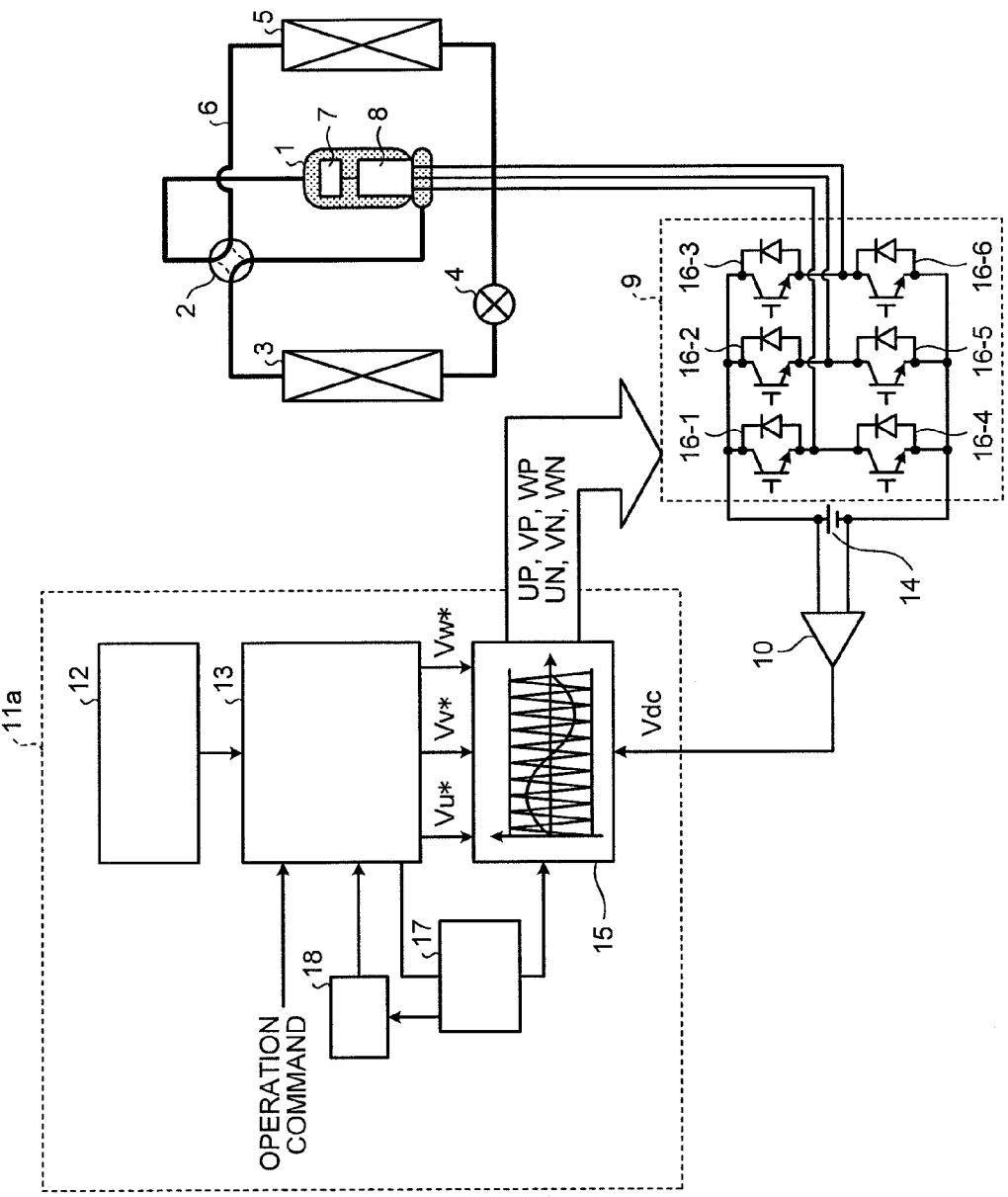
FIG. 7 is a diagram of a configuration example of an air conditioner in a second embodiment.

FIG. 7 is a diagram of a configuration example of a second embodiment of the air conditioner according to the present invention. The air conditioner in this embodiment is the same as the air conditioner in the first embodiment except that the air conditioner in this embodiment includes an inverter control unit 11a instead of the inverter control unit 11. The inverter control unit 11a is the same as the inverter control unit 11 in the first embodiment except that the inverter control unit 11a includes a PWM-signal correcting unit 18.

Figure 8:
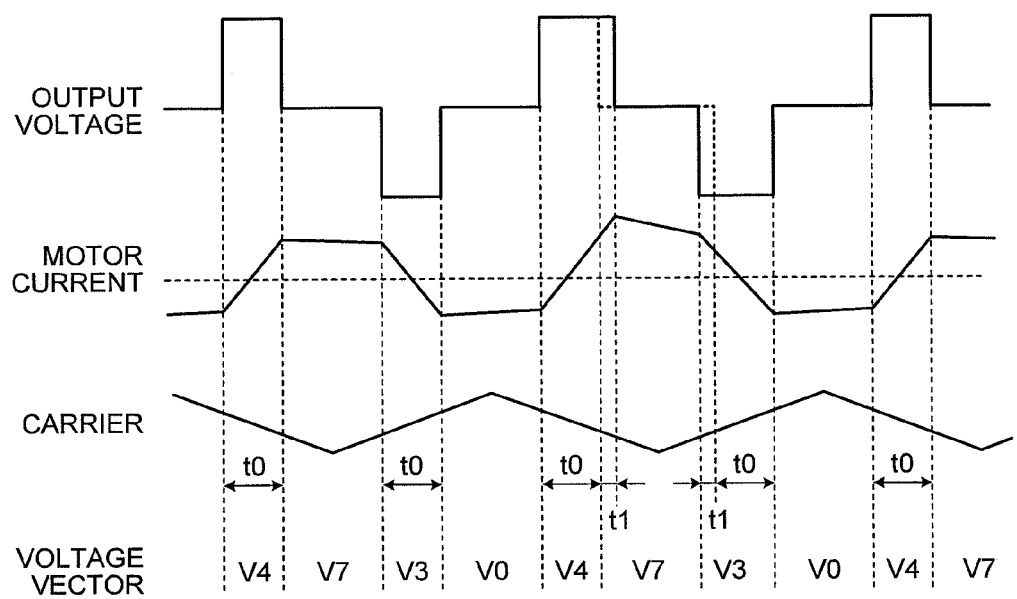
FIG. 8 is a diagram of an example of an operation waveform for explaining an operation in the second embodiment.

FIG. 8 is a diagram of an example of an operation waveform for explaining an operation in this embodiment. In this embodiment, an amount of an actual vector is increased only at a predetermined carrier cycle. As shown in FIG. 8, an output time of V4 is extended by t1. In the heating operation mode, the polarity of an electric current flowing to the motor 8 changes according to an output of actual vectors (the voltage vectors V4 and V3). That is, unless periods of V4 and V3 are the same, the positive and negative polarities of an electric current are unbalanced. Therefore, V3 is also extended by t1 according to the extension of the period of V4 by t1. Consequently, it is possible to prevent the positive and negative polarities from being unbalanced.

In this case, because each of the periods of V3 and V4 is extended by t1, a period of the zero vector V7 is reduced by t1×2 and the balance between V7 and V0 is lost. The period of the zero vector is an operation mode for reflux through diodes connected in inverse parallel to switching elements. Therefore, the PWM-signal correcting unit 18 applies correction equivalent to the reduction of the period of V7 to a signal generated by the PWM-generating unit 15 and outputs the signal to the inverter 9. Conversely, the period of V0 can be reduced by t1×2 and each of the periods of V3 and V4 before and after the period of V0 can be extended by t1. Further, the period of the zero vector can be increased by t1×2 and each of the periods of V3 and V4 before and after the period of the zero vector can be reduced by t1.

Figure 9:
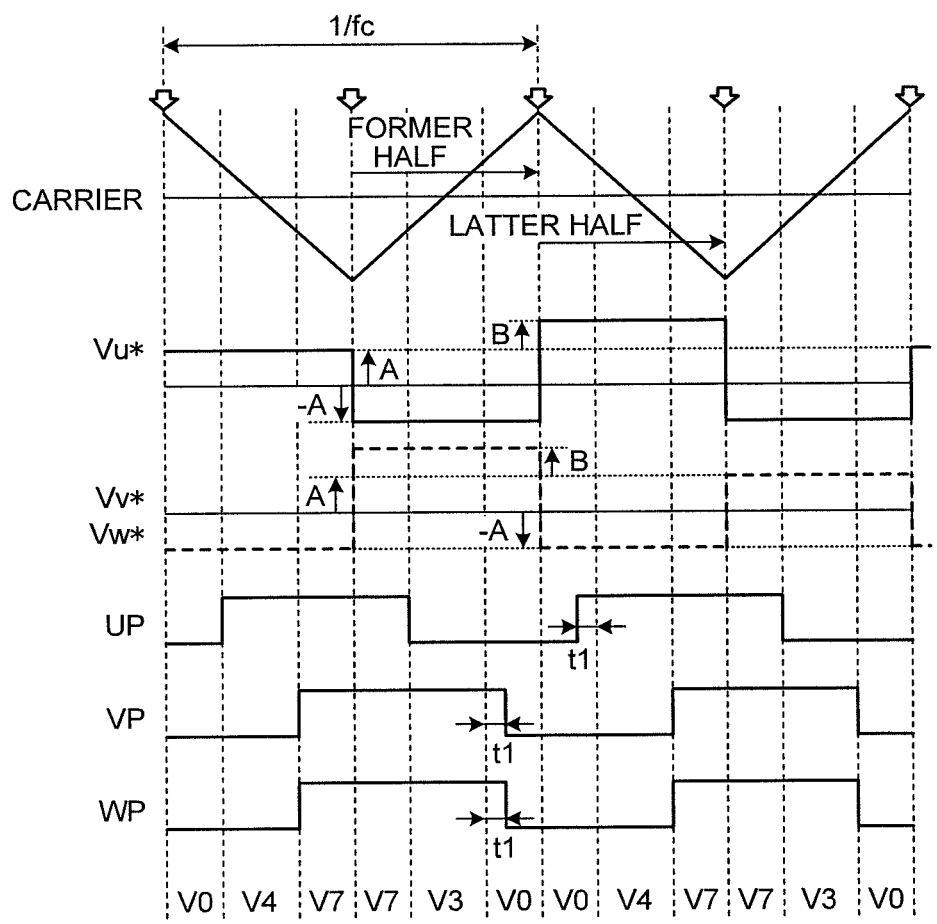
FIG. 9 is a diagram of an example of an operation waveform obtained when correction by a PWM-signal correcting unit is performed.

FIG. 9 is a diagram of an example of an operation waveform obtained when correction by the PWM-signal correcting unit 18 is performed. Note that, in the example shown in FIG. 9, ratios are dispersed from V0 to the actual vectors unlike the example shown in FIG. 8. The operation waveform shown in FIG. 9 is an improvement of the operation waveform in the first embodiment shown in FIG. 2. A voltage value at which a voltage command is Hi is changed. In a period in which each of the periods of V3 and V4 is extended by t1, a value of Hi is set to a value (A+B) obtained by adding a voltage value B equivalent to t1 in FIG. 8 to a voltage value A in the case of normal Hi. As a result, the zero vector decreases and the actual vectors increase. Consequently, it is possible to increase same amount of duty ratio for two actual vectors while avoiding unbalance of the positive and negative polarities.

According to the operation explained above, as shown in FIG. 9, the electric current primarily increases in only the positive polarity, and the large electric current flows in the positive polarity only in that cycle. Thereafter, if the period of the cycle V3 and the period of the next cycle V4 coincide with each other, the unbalance of the positive and negative polarities is eliminated in the next cycle. Thereafter, the operation mode can return to an operation mode in which an amount of the electric current same as the normal amount flows.

As is evident from the motor current waveform shown in FIG. 8, it is seen that an even-order harmonic wave is generated. The even-order harmonic wave is a frequency higher than a fundamental frequency such as secondary and quaternary harmonics. It is possible to superimpose a harmonic wave on an electric current flowing to the motor 8 during the heating operation mode by reducing or increasing one of the zero vectors only instantaneously as explained above and keeping an output time of the actual vectors the same. Moreover, it is possible to superimpose a frequency relatively close to the fundamental wave.

Consequently, electromagnetic sound concentrating on the fundamental wave is dispersed to even-order harmonic components as well, and it is made possible to reduce peak sound of the fundamental wave even a little. Further, it is possible to generate beat at a cycle lower than the fundamental wave by performing the increase or reduction of the output time of the actual vectors at a predetermined cycle. According to the period and the generation of the even-ordered components, the peak sound due to the fundamental wave decreases, and it is made possible to reduce a fundamental wave frequency of a motor current in the heating operation mode.

Furthermore, the peak sound is concentrated on a modulated frequency by modulating, with some frequency, a predetermined cycle for performing the increase or reduction of the output time of the actual vectors, and peaks of the fundamental wave frequency are dispersed. Consequently, the fundamental wave of the electric current flowing to the motor and the carrier frequency at which the switching elements operate coincide with each other. Therefore, by dispersing electromagnetic sound concentrating on this frequency to other frequencies, it is made possible to reduce the frequency without uselessly increasing the carrier frequency at which the switching elements operate, and consequently, it is made possible to reduce a switching loss.

Note that, when the operation in the heating operation mode is performed, as a frequency for a switching operation, a frequency high enough for not rotating the motor 8 is set. The frequency of the carrier is changed in the heating operation mode and the normal operation mode. As explained above, the high-frequency voltage is applied to the motor 8. Consequently, it is made possible to efficiently heat, without causing rotation torque and vibration, the motor 8 with a motor iron loss due to high-frequency voltage application and a copper loss generated by an electric current flowing to a winding wire. The refrigerant held up in the compressor 1 is heated and vaporized by the motor heating and leaks to the outside of the compressor. The stagnation detecting unit 12 determines, according to the temperature of the refrigerating cycle and the duration of the temperature, whether the refrigerant leak has occurred and the refrigerant has returned from the stagnation state to the normal state. When determining that the refrigerant has returned from the stagnation state to the normal state, the stagnation detecting unit 12 notifies the high-frequency-alternating-current-voltage generating unit 13 to that effect and ends the heating operation mode.

Note that the heating is performed with two losses of the copper loss of the winding wire and the iron loss according to the voltage application to the motor 8. However, in the case of a concentrated winding motor with a small coil end and low winding resistance, because the winding resistance is small and a heating value due to the copper loss is small, it is necessary to feed a large amount of electric current to the winding wire. Therefore, an electric current flowing to the inverter 9 also increases and an inverter loss becomes excessively large.

Therefore, when the heating by the high-frequency voltage application in this embodiment is performed, an inductance component due to a high frequency increases and winding impedance increases. Therefore, although the electric current flowing to the winding wire decreases and the copper loss decreases, an iron loss due to the high-frequency voltage application occurs instead and the motor can be effectively heated. Further, because the electric current flowing to the winding wire is small, a loss of the inverter 9 also decreases and it is possible to perform heating with a loss further reduced.

In a compressor of a scroll mechanism, because high-pressure relief of a compression chamber is difficult, when a liquid refrigerant enters the compression chamber, it is likely that excessively large stress is applied to a compression mechanism and the compression mechanism is broken. According to this embodiment and the first embodiment, it is possible to perform heating of the inside of the compression chamber with high efficiency. Therefore, this embodiment and the first embodiment are effective for prevention of the breakage.

Further, in the case of a heating apparatus having a frequency exceeding 10 kilohertz and an output exceeding 50 watts, although there is the limitation pursuant to the Radio Law Section 100, by improving a PWM-signal generating method to be adapted to electromagnetic sound as described in the first embodiment and this embodiment even at a frequency in the audible range, it is possible to use a frequency lower than 10 kilohertz and easily realize heating exceeding 50 watts. Consequently, it is possible to heat the compressor without a problem of high-frequency electromagnetic sound in a heating operation without causing a trouble to a consumer, who is a user, while observing the Radio Law.

Note that, when the carrier signal, in which two or more cycles are switched, is used as explained in the first embodiment, the period of the zero vector may be reduced and the period of the actual vectors can be increased as explained in this embodiment.

It goes without saying that the effects explained in the first and second embodiments are attained even when the switching elements 16-1 to 16-3 on the upper side and the switching elements 16-4 to 16-6 on the lower side in this embodiment and the first embodiment are configured by wide band gap semiconductors such as GaN (gallium nitride), SiC (silicon carbide), and diamond. Moreover, it is possible to reduce the size of the switching element group because voltage resistance is increased and allowable current density is also increased by using the wide band gap semiconductor. It is possible to reduce the size of a semiconductor module incorporating these elements. Because heat resistance is also high, it is also possible to reduce the size of a radiation fin of a heat sink. Further, because a switching loss is extremely smaller than a switching loss of a silicon-based semiconductor or the like, the switching elements are suitable for application of a high-frequency voltage, and thus it is made possible to efficiently use the inverter 9.

Further, in the above explanation, all of the switching elements on the upper side and the switching elements on the lower side are configured by the wide band gap semiconductors. However, rather than configuring all the switching elements with the band gap semiconductors, only the switching elements 16-1 to 16-3 on the upper side or the switching elements 16-4 to 16-6 on the lower side can be configured by the wide band gap semiconductors. In this case, the voltage vector to be the zero vector is arranged to be adjusted to the side where the wide band gap semiconductors are configured. Consequently, it is made possible to reduce a conduction loss caused by a flow of an electric current.

Further, the switching elements 16-1 to 16-6 are configured by elements for switching such as transistors or IGBTs and reflux diodes connected in parallel to the elements. However, the wide band gap semiconductors can be used only for the reflux diodes connected in inverse parallel to the elements for switching. Further, when the conduction ratio of the diodes in the heating operation mode is lower than that in the normal operation mode, the wide band gap semiconductor can be used only for the elements for switching rather than the reflux diodes.

Further, because heat resistance is improved when the wide band gap semiconductor is used, a fan motor for air cooling can be stopped in the heating operation mode. In particular, because heating for stagnation suppression (shifting to the heating operation mode when stagnation is detected) is performed during the operation stop of the motor, it is possible to reduce power consumption during the operation stop, i.e., so-called operation standby by an amount equivalent to fan motor driving. Consequently, it is made possible to realize a further reduction in standby power.

The invention claimed is:
1. A heat pump device comprising:
   a compressor including a compression mechanism configured to compress a refrigerant and a motor configured to drive the compression mechanism;

heat exchangers;
an inverter configured to apply a desired voltage to the motor; and
an inverter control unit configured to generate Pulse Width Modulation (PWM) signals for driving the inverter, wherein
the inverter control unit includes:
   a heating determining unit configured to determine whether heating of the compressor is necessary and notify a determination result; and
   a Pulse Width Modulation (PWM)-signal generating unit configured to shift to, upon receiving the notification indicating that the heating is necessary, a heating operation mode for heating the compressor and, in the heating operation mode, generate the PWM signal to provide, based on a heating time carrier signal having two or more predetermined frequencies, a period in which a reflux current flows, and
the heating time carrier signal is generated to form a combined cycle in which the predetermined frequencies are arranged in a predetermined order by cyclically switching each of the predetermined frequencies at each one cycle and repeat the switching in the combined period for each combined period, and a combined frequency, which is a frequency corresponding to the combined cycle, is set to a frequency equal to or lower than 20 hertz.

2. The heat pump device according to claim 1, wherein in the heating operation mode, when switching elements configuring the inverter are divided into an upper side switching element group and a lower side switching element group, the PWM signal generating unit reduces a first period, which is a period in which all the switching elements of the upper side switching element group are turned on, from an immediately preceding first period by a predetermined time or reduces a second period, which is a period in which all the switching elements in the lower side switching element group are turned on, from an immediately preceding second period by the predetermined time, and increases, by a half of the predetermined time, each of periods of other switching states before and after the period reduced by the predetermined time.

3. The heat pump device according to claim 1, wherein at least one of the upper side switching element group and the lower side switching element group configuring the inverter is formed by wide band gap semiconductors.

4. The heat pump device according to claim 1, wherein diodes configuring the inverter are formed by wide band gap semiconductors.

5. An air conditioner comprising the heat pump device according to claim 1.

6. A refrigerating machine comprising the heat pump device according to claim 1.

7. A heat pump device comprising:
a compressor including a compression mechanism configured to compress a refrigerant and a motor configured to drive the compression mechanism;
heat exchangers;
an inverter configured to apply a desired voltage to the motor; and
an inverter control unit configured to generate Pulse Width Modulation (PWM) signals for driving the inverter, wherein
the inverter control unit includes:
   a heating determining unit configured to determine whether heating of the compressor is necessary and notify a determination result; and
   a Pulse Width Modulation (PWM)-signal generating unit configured to shift to, upon receiving the notification indicating that the heating is necessary, a heating operation mode for heating the compressor and, in the heating operation mode, generate the PWM signals to provide, based on a heating time carrier signal having two or more predetermined frequencies, a period in which a reflux current flows, and
the heating time carrier signal is generated by switching the predetermined frequencies in random order.

8. The heat pump device according to claim 7, wherein in the heating operation mode, when switching elements configuring the inverter are divided into an upper side switching element group and a lower side switching element group, the PWM signal generating unit reduces a first period, which is a period in which all the switching elements of the upper side switching element group are turned on, from an immediately preceding first period by a predetermined time or reduces a second period, which is a period in which all the switching elements in the lower side switching element group are turned on, from an immediately preceding second period by the predetermined time, and increases, by a half of the predetermined time, each of periods of other switching states before and after the period reduced by the predetermined time.

9. The heat pump device according to claim 7, wherein at least one of the upper side switching element group and the lower side switching element group configuring the inverter is formed by wide band gap semiconductors.

10. The heat pump device according to claim 7, wherein diodes configuring the inverter are formed by wide band gap semiconductors.

11. An air conditioner comprising the heat pump device according to claim 7.

12. A refrigerating machine comprising the heat pump device according to claim 7.

13. A heat pump device comprising:
a compressor including a compression mechanism configured to compress a refrigerant and a motor configured to drive the compression mechanism;
heat exchangers;
an inverter configured to apply a desired voltage to the motor; and
an inverter control unit configured to generate Pulse Width Modulation (PWM) signals for driving the inverter, wherein
the inverter control unit includes:
   a heating determining unit configured to determine whether heating of the compressor is necessary and notify a determination result; and
   a Pulse Width Modulation (PWM)-signal generating unit configured to shift to, upon receiving the notification indicating that the heating is necessary, a heating operation mode for heating the compressor and, in the heating operation mode, generate the PWM signals to provide, based on a heating time carrier signal having two or more predetermined frequencies, a period in which a reflux current flows, and
in the heating operation mode, when switching elements configuring the inverter are divided into an upper side switching element group and a lower side switching element group, the heat pump device reduces a first period, which is a period in which all the switching elements of the upper side switching element group are turned on, from an immediately preceding first period by a predetermined time or reduces a second period, which is a period in which all the switching elements in the lower side switching element group are turned on, from an immediately preceding second period by the predetermined time and increases, by a half of the predetermined time, each of periods of other switching states before and after the period reduced by the predetermined time.

14. The heat pump device according to claim 13, wherein, in the period increased by the predetermined time, the heat pump device increases, by a predetermined value, a voltage value of a high-frequency alternating-current voltage, for generation of which the PWM signals are used.

15. The heat pump device according to claim 13, wherein at least one of the upper side switching element group and the lower side switching element group configuring the inverter is formed by wide band gap semiconductors.

16. The heat pump device according to claim 13, wherein diodes configuring the inverter are formed by wide band gap semiconductors.

17. An air conditioner comprising the heat pump device according to claim 13.

18. A refrigerating machine comprising the heat pump device according to claim 13.

* * * * *